United States Patent

[11] 3,608,942

| [72] | Inventor | Joseph L. Telles |
| | | 1570 Blake Ave., Los Angeles, Calif. 90031 |
| [21] | Appl. No. | 844,825 |
| [22] | Filed | July 25, 1969 |
| [45] | Patented | Sept. 28, 1971 |

[54] BUMPER DEVICE
1 Claim, 5 Drawing Figs.

| [52] | U.S. Cl. | 293/65, 293/71 R |
| [51] | Int. Cl. | B60r 19/08 |
| [50] | Field of Search | 114/219; 293/64, 65, 66, 67, 71, 99 |

[56] References Cited
UNITED STATES PATENTS

| 2,182,085 | 12/1939 | Kellner et al. | 293/67 |
| 3,197,189 | 7/1965 | Pemper et al. | 114/219 |

FOREIGN PATENTS

| 278,004 | 12/1964 | Australia | 293/65 |

Primary Examiner—Drayton E. Hoffman
Assistant Examiner—Robert Saifer
Attorney—Berman, Davidson and Berman ABSTRACT: A bumper device including a pair of rubber-covered blocks with a U-shaped bracket connected to one end thereof and an outwardly extending and downwardly extending member having an L shape connected to another end thereof for attaching the blocks to the tow plate of a tow truck.

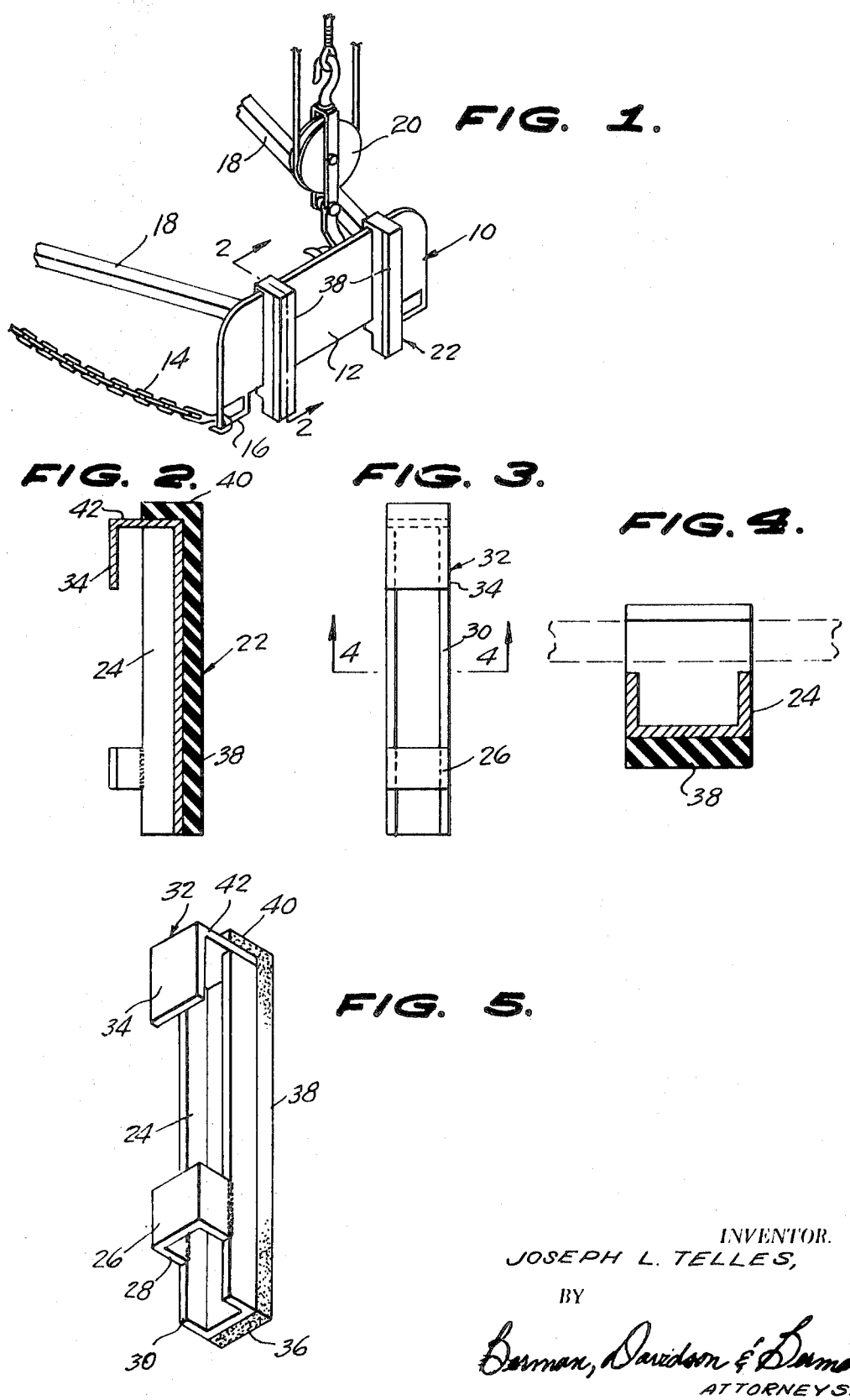

BUMPER DEVICE

The present invention relates to a bumper device an more particularly to a bumper device that is used with a tow truck and the like.

It is an object of the present invention to provide a bumper device to keep the center of the bumper of a vehicle or truck or other device being towed by a tow truck from coming directly into contact with the tow plate of the towing vehicle.

It is yet another object of the present invention to provide a bumper device for attachment to the tow plate of a towing vehicle so that a vehicle that is being towed will not have its bumper damaged or disfigured by being towed.

It is yet another object of the present invention to provide a bumper device for attachment to the tow plate of a towing vehicle so that a vehicle that is being towed will not have any damage done to its bumper should the bumper be of a pointed configuration as is commonly provided on late-model cars.

Another object of the present invention is to provide a bumper device for attachment to the tow plate of a tow vehicle so that the center of the bumper of the car being towed will not lay directly on the tow plate.

It is still a further object of the present invention to provide bumper means for attachment to a tow plate of a towing vehicle so that the vehicle being towed will not have any damage done to the metal splash pan generally located below the bumper.

It is a further object of the present invention to provide bumper means for attachment to the tow plate of a towing vehicle so that the bumper means when properly mounted will keep the tow chain used to tow the car away form the lower part of the car.

It is yet another object of the present invention to provide a simple yet rugged and inexpensive bumper device for attachment to the tow plate of a towing vehicle for preventing damage to a car being towed by the vehicle.

Various other objects and advantages of the present invention will be readily apparent from the following detailed description when considered in connection with the accompanying drawing forming a part thereof, and in which:

FIG. 1 illustrates the bumper means embodying the present invention shown attached to the tow plate of a towing vehicle;

FIG. 2 is a sectional view taken along the lines 2—2 of FIG. 1;

FIG. 3 is a view of the bumper device shown in FIG. 2 and looking at it from the left side;

FIG. 4 is a section taken along the lines 4—4 of FIG 3; and

FIG. 5 is a perspective view of the bumper device embodying the present invention.

Referring to the drawing, the reference numeral 10 generally designates the tow plate of a towing vehicle which generally comprises a vertical transversely extending plate 12 with the usual tow chains 14 connected to brackets 16 of the plate when they are not in use.

The plate is supported by two diagonally extending members 18 and is connected to the usual block and tackle device 20 for hoisting the plate after the tow chains have been secured to a car or vehicle to be towed.

The bumper device of the present invention is generally designated as 22 and comprises a substantially vertically extending U-shaped or channel member 24 with a U-shaped bracket 26 having its legs 28 secured to the corresponding legs 30 of the channel member 24 by welding or other suitable means. The bracket 26 is disposed adjacent the lower end of the channel member 24 while an L-shaped member 32 is secured to the top of the channel member 24 and has its vertical leg 34 extending downwardly toward the bracket 26.

The bight or rear side 36 of the channel member 24 has secured thereto by any suitable means a rubber block 38. The block 38 also has a horizontal portion 40 extending forwardly thereof and secured to the horizontal leg 42 of the L-shaped member 32.

In operation, the bumper device 22 is secured to the tow plate 12 by connecting them so that the L-shaped member 32 fit over the top of the tow plate 12, as best seen in FIG. 1.

When it is desired to tow a vehicle by the tow truck, the tow plate 12 is disposed adjacent the front of the vehicle and the tow chains 14 are properly secured to the vehicle, after which the tow plate 12 is disposed adjacent the front bumper of a vehicle so that the bumper will bear against the rubber blocks 38 on the bumper device and the bumper will be maintained out of contact with the tow plate 12. This is particularly useful when the bumper of the more modern-day cars, which are sometimes pointed, are towed, as it is apparent that the point configuration of the bumper makes the car more difficult to handle.

Thus, the present invention provides a bumper device that can be readily attached to the tow plate of a tow vehicle so that the center of the bumper of the car will not come into contact with or bear against the tow plate and the bumper device of the present invention will thus prevent damage to most cars. The bumper device will further prevent any damage to the metal splash pans disposed below the bumpers of vehicles and will keep the tow chains used to tow the car away from the lower part of the car.

From the foregoing description, it will be apparent that various changes may be made in the form, location and relative arrangement of several parts without departing from the essential characteristics of the invention, and it is to be understood that this invention is not to be limited except by the scope of the appended claims.

What is claimed is:

1. In combination with the tow plate of a tow vehicle, at least two bumper devices mounted in spaced apart relationship on said tow plate, each bumper device comprising a channel member with a bracket member on its lower end and a bracket member on its upper end adapted to be secured to the tow plate and resilient means secured to said channel member, wherein said lower channel member is U-shaped, said lower bracket member is U-shaped and said upper bracket member is L-shaped, and wherein said resilient means includes a rubber member of rectangular configuration with a horizontal section disposed over said L-shaped bracket member.